US010526185B2

(12) United States Patent
Jagannathan et al.

(10) Patent No.: US 10,526,185 B2
(45) Date of Patent: Jan. 7, 2020

(54) USER-CONTROLLED VOLUME REGULATION MECHANISM FOR AUTOMATIC CONSUMABLE DISPENSERS

(71) Applicant: NEW YORK UNIVERSITY, New York, NY (US)

(72) Inventors: Ramesh Jagannathan, Abu Dhabi (AE); Mohammed Yaseer Omar, Abu Dhabi (AE); Dirichi D. Ike-Njoku, Abu Dhabi (AE); Pablo Pacareu, Montevideo (UY); Vasily Rudchenko, Kiev (UA); Pedro Zufiria, Madrid (ES)

(73) Assignee: NEW YORK UNIVERSITY, New York, NY (US)

( * ) Notice: Subject to any disclaimer, the term of this patent is extended or adjusted under 35 U.S.C. 154(b) by 238 days.

(21) Appl. No.: 15/473,349

(22) Filed: Mar. 29, 2017

(65) Prior Publication Data

US 2017/0283236 A1    Oct. 5, 2017

Related U.S. Application Data

(60) Provisional application No. 62/315,388, filed on Mar. 30, 2016.

(51) Int. Cl.
*B67D 1/00*     (2006.01)
*B67D 1/08*     (2006.01)
(Continued)

(52) U.S. Cl.
CPC ......... *B67D 1/0037* (2013.01); *B67D 1/0888* (2013.01); *B67D 1/0895* (2013.01);
(Continued)

(58) Field of Classification Search
CPC .. B67D 1/0037; B67D 1/1236; B67D 1/1247; B67D 1/1293; B67D 2001/1261; B67D 2001/1259; G01F 17/00
(Continued)

(56) References Cited

U.S. PATENT DOCUMENTS 3,916,963 A * 11/1975 McIntosh ................ B67D 3/00
                                                    141/198
4,202,387 A *  5/1980 Upton ..................... B65B 3/36
                                                    141/360
(Continued)

OTHER PUBLICATIONS

Dellen, et al., "Volume measurement with a consumer depth camera based on structured infrared light", 16th Catalan Conference on Artificial Intelligence, poster session, Oct. 2013, pp. 1-10, Vic, Spain.
(Continued)

*Primary Examiner* — Timothy L Maust
(74) *Attorney, Agent, or Firm* — Foley & Lardner LLP

(57) ABSTRACT

An automated consumable dispenser with a precision method for delivering consumable ingredients in specific proportions to a container up to a specified volume. This method involves the use of a system of sensors and a micro-microprocessor, which detects, digitizes and develops a three dimensional rendering of the container, calculates the container volume and dispenses specific amounts of consumable ingredients. A user is able to pick the level in the vessel to which the consumable ingredients should be dispensed and displays the selected desired level. The embodiments described include an automated dispenser capable of dispensing beverages and food items, either separately or together.

8 Claims, 5 Drawing Sheets

(51) Int. Cl.
*B67D 1/12* (2006.01)
*B67D 1/16* (2006.01)
*G01B 11/25* (2006.01)
*G01F 17/00* (2006.01)

(52) U.S. Cl.
CPC ........... *B67D 1/125* (2013.01); *B67D 1/1247* (2013.01); *B67D 1/1293* (2013.01); *B67D 1/16* (2013.01); *G01B 11/2518* (2013.01); *G01F 17/00* (2013.01)

(58) Field of Classification Search
USPC ........................................ 141/83, 94, 95, 198
See application file for complete search history.

(56) References Cited

U.S. PATENT DOCUMENTS

| | | | |
|---|---|---|---|
| 4,236,553 A * | 12/1980 | Reichenberger | B67D 1/08 141/198 |
| 4,895,194 A * | 1/1990 | McCann | B67D 1/1238 141/198 |
| 5,027,284 A | 6/1991 | Senghaas et al. | |
| 5,431,302 A | 7/1995 | Tulley et al. | |
| 5,454,406 A | 10/1995 | Rejret et al. | |
| 5,491,333 A | 2/1996 | Skell et al. | |
| 5,566,732 A | 10/1996 | Nelson | |
| 5,839,483 A | 11/1998 | Rejret et al. | |
| 6,105,607 A * | 8/2000 | Caise | F16K 31/402 137/487.5 |
| 6,449,970 B1 * | 9/2002 | Gagliano | B67D 1/0006 62/196.4 |
| 6,684,920 B2 * | 2/2004 | Seitz | B67D 1/0085 141/198 |
| 7,546,854 B2 * | 6/2009 | Ozanne | B67D 1/1238 141/198 |
| 7,661,448 B2 * | 2/2010 | Kim | B67D 1/0005 141/360 |
| 7,950,424 B2 | 5/2011 | Ozanne et al. | |
| 8,322,384 B2 * | 12/2012 | Ashrafzadeh | F25D 23/126 141/192 |
| 8,443,614 B2 * | 5/2013 | Kim | F25D 29/00 141/370 |
| 8,695,646 B2 * | 4/2014 | Agam | A47J 31/44 141/198 |
| 9,469,517 B2 * | 10/2016 | Willis | B67D 1/0014 |
| 9,796,575 B2 * | 10/2017 | Deng | A47J 31/4482 |

OTHER PUBLICATIONS

Sick Sensor Intelligence, "Technical Description, Smart camera IVC-3D", Mar. 2010, 10 pages, Sick AG, Waldkirch, Germany.

* cited by examiner

USER-CONTROLLED VOLUME REGULATION MECHANISM FOR AUTOMATIC CONSUMABLE DISPENSERS

CROSS-REFERENCE TO RELATED PATENT APPLICATIONS

This application claims benefit of and priority to U.S. Provisional Patent Application No. 62/315,388 filed Mar. 30, 2016, which is herein incorporated by reference in its entirety.

FIELD OF INVENTION

Embodiments described herein are related to the field of automatic food and beverage dispensing machines.

BACKGROUND OF THE INVENTION

Automatic beverage dispensers have become a more frequently utilized technology. As popularity grows, the desire for a better user experience and ease of use for automatic beverage dispensers is also increasing. Mechanical, automatic beverage dispenser allow for only fixed portions of ingredients and amounts to be dispensed. In other words, there are a pre-set, limited amount of options for delivery of the selected beverage into a container.

The use of the static, automatic beverage dispensers leads to a variety of problems with the user experience and with the cost of operating the machine. With the current technology, a user must have the beverage be filled into a standardized container size. For example, if a user wanted more coffee than the highest standardized size setting, they would be unable to do so, or would have to run multiple cycles, assuming additional cycles would not overflow the cup. Conversely, if the user wanted a beverage amount less than the smallest standardized size they would be unable to lower the amount and would waste the extraneous beverage dispensed.

It is common for a user to provide their own container to be filled with a beverage from the machine. If the user container were not exactly to the standardized size programmed into the machine, there will be additional issues with waste, under-dispensing and a frustrating user experience in trying to determine the appropriate size setting for the unique user cup. There has been some advancement in customizing this process but the existing solutions are expensive and cumbersome to use. It would be ideal if there was a dispensing mechanism available that is able to provide a precise amount of a selected beverage, regardless of container shape or size and to dispense the selected beverage efficiently and effectively.

SUMMARY OF THE INVENTION

One implementation relates to an automatic consumable dispenser with a reservoir of ingredients, consisting of solids and liquids, that are used to produce a variety of consumables, both beverages and food, wherein the dispenser has a loading bay that includes a plurality of sensors, a mechanical consumable height lever with a visual aid marking device, and a nozzle to deliver the eventual consumables. The machine has a microprocessor that is configured to take in a digital scan, develop a three dimensional scan, calculate the volume of the container, determine the user selected dispensing level and calculate the amount of ingredients to dispense into the container.

Another implementation relates to a method of calculating and dispensing a consumable into a container in accordance with a user selected amount. A container is placed into the dispensing machine's loading bay by a user and a plurality of sensors in the bay scan the container. The user is able to vertically slide a measurement arm to the user-desired level of consumable in the container. A microprocessor, digitizes the sensors' scans, develops a three dimensional rendering, receives the mechanical arm height, receives the user selected consumable choice, and calculates the proper amount of ingredients to dispense. The machine dispenses the calculated ingredients and liquid into the container.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE PREFERRED EMBODIMENTS

Figure 1:
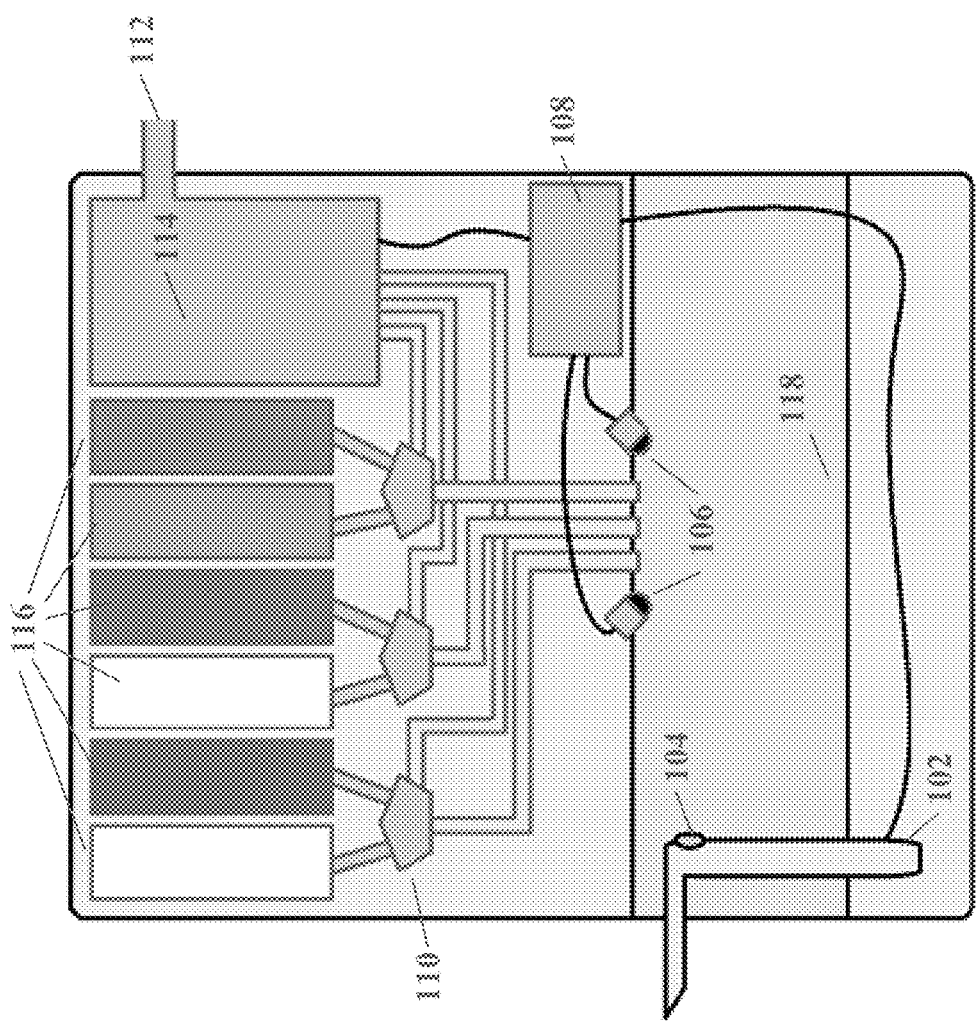
FIG. 1 illustrates one implementation a user-controlled volume regulation mechanism on an automatic consumable dispenser.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods for calculating and dispensing consumables utilizing a dynamic, user-controlled, volume regulation mechanism in an automatic consumable dispenser. In some embodiments, the user-controlled mechanism is integrated into an existing automatic beverage machine with alterations to allow for food ingredients, for example popcorn, to be stored, with a microprocessor configured to communicate and control the existing dispenser's ingredients and controls. In other embodiments, the user-controlled mechanism is part of a dedicated automatic consumable dispenser, wherein the construction of the automatic dispenser and the ingredient reservoirs are done to optimize the user-controlled mechanisms properties. In some embodiments, the consumable dispensed can be a beverage, a food item, or a combination of both.

One implementation, shown in FIG. 1, relates to an automatic consumable dispenser that employs a microprocessor 108 operably connected to a plurality of scanning sensors 106 and a mechanical lever 102 with a laser pointer 104, wherein the pair work together to allow control of the level and type of consumable 126 dispensed into a user provided container 120. The plurality of sensors 106 can be any number of sensors arranged around the loading bay, that enable an accurate and efficient scan of the container 120 to occur. The microprocessor 108 may be in communication with and control of a plurality of ingredient reservoirs 116 located in another area of the consumable dispenser. The ingredients are released in specific increments, according to the user selection or pre-set ratios of the selected consumable 126, the presented container 120, and the user adjusted mechanical lever 102. In one embodiment, all measurement calculations are done by the microprocessor 108.

The automatic consumable dispenser has a water supply 112 and liquid heater 114 for user selected consumable options that require a water supply 112 and for the water supply 112 to be heated, for example, if the user selected a consumable that was a beverage, for example hot chocolate, coffee, tea, etc. The water supply 112 is controlled by the microprocessor 108 which is configured to calculate how much liquid is required for the given calculated volume, based upon the plurality of user selections. The water supply 112 and the ingredients 116 are both connected to the mixing plates 110. In some embodiments, the mixing plates 110 are all different types of mixers to accommodate different consumable selections, regardless of them being a liquid, a solid or a combination of both. For example, one mixing plate 110 may have a grinder and be connected to the coffee ingredient 116, while another mixing plate 110 in the same automatic consumable machine may have a filter connected to the tea consumable option, wherein the filter strains out the solid ingredient so that only a liquid travels to the user container 120. The mixing plates can be designed to effectively mix the water supply 112 and ingredients 116 to generate the desired user-selected consumable 126 into the user-selected container 120 at the user-selected level. In some embodiments, the mixing plates can be structured to facilitate the transport of food item ingredients in the reservoir. In some embodiments, the mixing plates may have mechanisms to push the solid food items, for example, cereal, through the tubing to effectively deliver it to the container.

Expanding further upon the plurality of ingredient reservoirs 116, the reservoir includes a plurality of individual ingredients for all of the consumable 126 options in the automatic consumable dispenser. The ingredients in the plurality of ingredient reservoirs 116 can be diluted or can be pure, liquid or solid, for example milk, carbonated water, orange juice, flavorings, artificial flavorings, coffee grinds, sugar, or popped popcorn, cereal, chocolate chunks, etc. In some embodiments, the carbonated water is in a resting state of un-carbonated water, and is carbonated upon selection by, for example, a specialized mixing plate 110. The water supply 112 can be separate from the plurality of ingredient reservoirs 116 or it can be part of the plurality of ingredient reservoirs 116. The liquid heater 114 may be connected just to the water supply 112 or if alternative liquids in the plurality of ingredient reservoirs 116 need to be heated, they can be individually connected to the liquid heater 114. For example, the plurality of ingredient reservoirs 116 may have an individual ingredient of milk which may have to distinct connections, one directly to the mixing plates 110 and separate connection that runs through the liquid heater 114 before going to the mixing plates 110. This allows the machine to dispense heated milk for hot consumable 126 options, such as a latte, while still being able to provide unheated milk for other consumables 126 options, such as chocolate milk. The machine could subsequently dispense cereal into the already dispensed chocolate milk, with the mixing plates 110 facilitating the transport of both types of consumables into the container.

Figure 2:
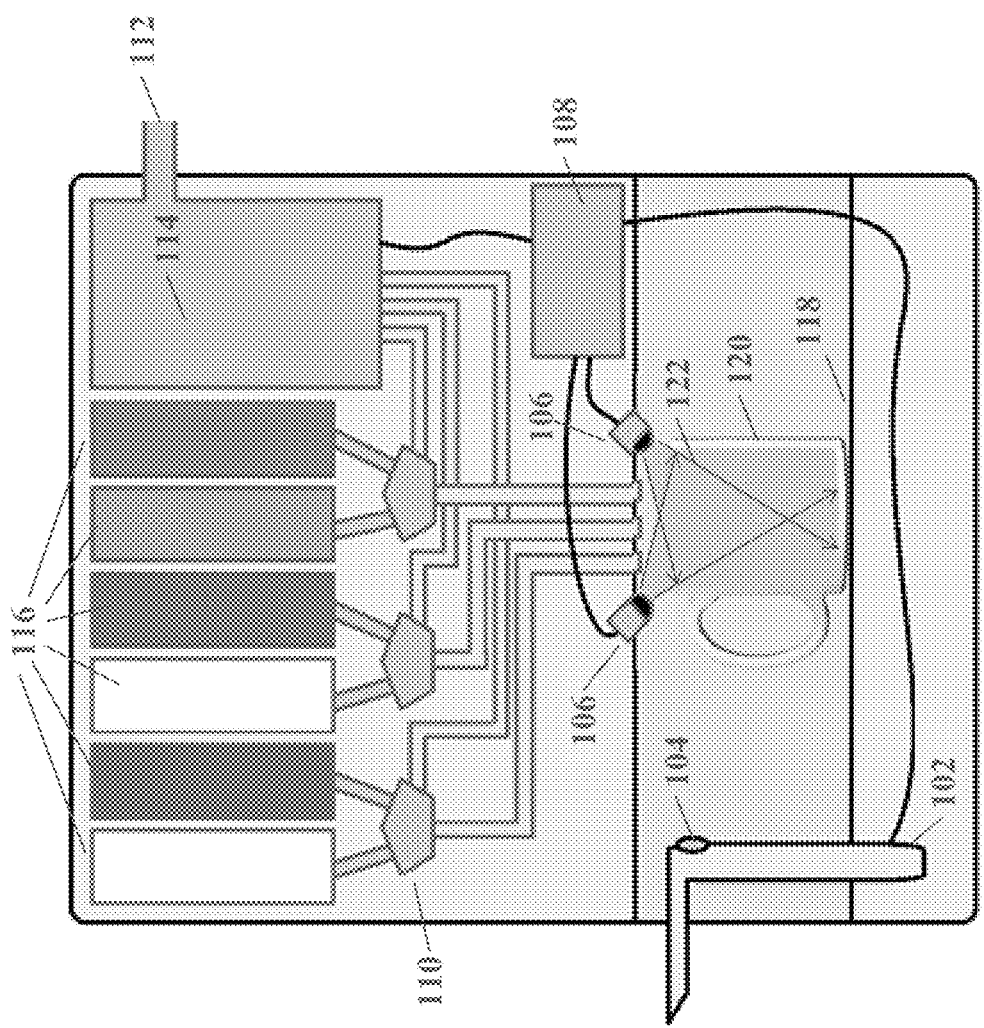
FIG. 2 illustrates one implementation of the use of a plurality of sensors in a user-controlled volume regulation mechanism.

In some embodiments, the automatic consumable dispenser has a loading bay 118 for the user container 120 to be placed. As shown in FIG. 2, the loading bay 118 is positioned such that it provides the best angle and view for the plurality of sensors 106 to scan the container 120. Under normal operating conditions, a user will approach the automatic consumable dispenser and make a consumable 126 selection. The user will place a container 120 into the loading bay 118. Embodiments are not limited to a specific container 120 size or container 120 shape, the only limiting factor for the container 120 size and shape is the size of the loading bay 118. Once the container 120 is loaded, the plurality of sensors 106 begin scanning 122 the container 120 to determine the length, width, height, shape, and structure of the container 120. The plurality of sensors 106 are able to take the scans of the visual images and convert the images digitally to the microprocessor 108. In some embodiments, the plurality of sensors 106 send the visual scans 122 to the microprocessor 108 unaltered, and the microprocessor 108 digitizes the visual scans.

In some embodiments, the plurality of sensors 106 are optimized to scan and generate a three dimensional image using a sensor laser and fast data processing. The plurality of sensors 106 use lasers to 'draw' lines on the object in the loading bay 118 and, by utilizing triangulation, determine the third dimension of the container 120. As the plurality of sensors 106 scan the object and detect a curve, the sensors 106 interpret, estimate and calculate the height profile of the object in order to generate a more accurate and clear measurement for the dimensions of the container 120. The plurality of sensors 106 can be configured to automatically begin scanning an object in the loading bay 118 when the sensors detect a change in the environment. For example, using a simple light-switch in tandem with the plurality of sensors 116 the system can detect the addition of an object to the loading bay 118. In some embodiments, the plurality of sensors 106 do not activate until the user selects a consumable 126 option or activates the dispensing process.

In other embodiments, the plurality of sensors 106 are optimized for using a depth sensor and a structured infrared-light system. The plurality of sensors 106 utilize object silhouettes from different views of the object to find a boundary volume that is formed by back-projecting the silhouettes. The process for finding the boundary volume can include first taking in a plurality of views based on the number of sensors 106 around the loading bay 118, the location of the sensors 106, and the angle of the sensors 106. The plurality of sensors 106, either in their own processing operations or through the microprocessor 108, differentiate the vertices of the container 120 from the background to remove the background. Each view is processed using back and forward projections to provide a plurality of data points, this process can be aided by structuring the loading bay 118 in an optimal way. For example, by having the loading bay 118 be a distinct color and programming that information into the processing unit, the plurality of sensors 106 and microprocessor 108 will be able to determine more efficiently and accurately the parts of the view that are the loading bay 118 and the parts of the view that are the bounds of the container 120. Next, the plurality of data sets are merged into a common coordinate system and analyzed to determine the boundaries of the container 120 resulting in an accumulation matrix which is a summation of the back and forward projections of the data points. Any gaps or missing data points in the various images and data points are estimated and filled in, providing a smooth, accurate rendering of the container 120. Finally, the volume of the container 120 is calculated as a function of the sum of the discrete elements from the accumulation matrix.

In some embodiments, the microprocessor 108 is configured to take the images from the plurality of sensors 106 and generate a three dimensional rendering of the container 120. Using the scanned images, the microprocessor 108 is able to accurately calculate the volume of the container 120 regardless if the container 120 has a unique shape or a design that is uncommon. The microprocessor 108 stores the information for the calculated total volume of the container 120 as well as the shape of the container for future processing depending on the user-controlled volume preference for the consumable 126. The microprocessor 108 can be loaded with the predicted volume of certain designated unit for each of the consumables in the reservoir 116. For example, a bowl may be placed in the loading bay 118, with the user selecting cereal, moving the mechanical lever 102 and laser pointer 104 to the midway point on the bowl. The microprocessor 108 can be preloaded with information regarding the volume for both the cereal and milk required to complete the user selection. The microprocessor 108, using the container image generated from the plurality of sensors 106, determines the dispensing amount of each ingredient to fill half of the bowl.

Figure 3:
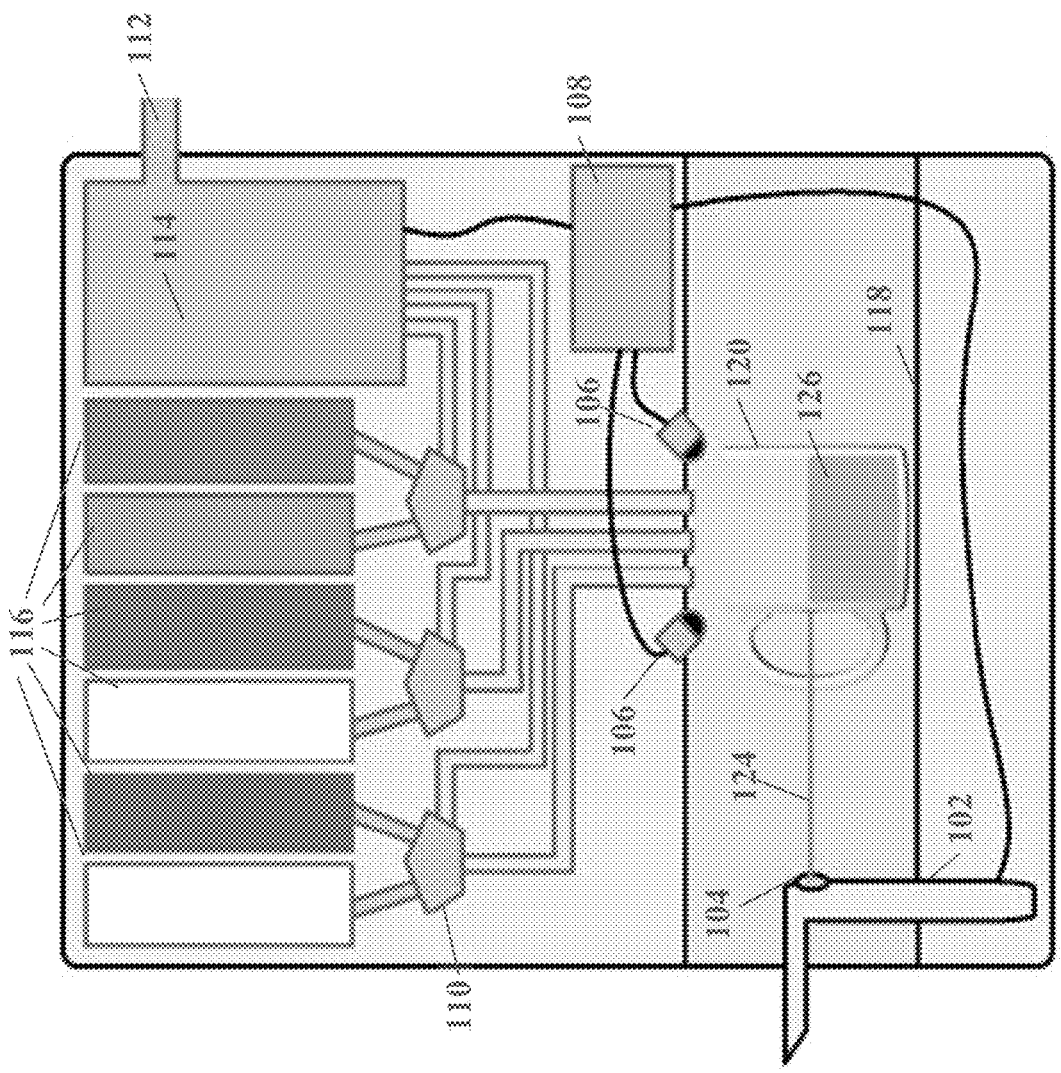
FIG. 3 illustrates one implementation of the use of a mechanical arm laser pointer in a user-controlled volume regulation mechanism.

As shown in FIG. 3, once the user has placed a container 120 into to the loading bay 118 and made a consumable 126 selection, the mechanical lever's 102 laser pointer 104 is activated and emits a laser 124 onto the container 120. The user then adjusts the mechanical lever 102 to the desired level at which they would like their consumable 126 to be dispensed into the container 120. The mechanical lever 102 is designed to slide vertically throughout the entire height of the loading bay 118. In one embodiment, the mechanical lever 102 may be electronically controlled, such as by servos, where the user indicates "up" or "down" via a control panel (not shown) or the like. The laser pointer 104 is not used in any of the calculations by the microprocessor 108, however it provides a visual point of reference for the user to easily and effectively select the desired level of consumable 126 in the container 120. The input value that the microprocessor 108 is receiving is the vertical displacement of the mechanical lever 102 as it is being adjusted by the user to reach the user-desired consumable 126 level in the container 120. Specifically, the distance is the vertical displacement of the laser pointer 104 in relation to the base of the loading bay 118 that the container 120 is sitting on. The mechanical lever 102 is configured to be displaced vertically in small increment value, for example 1 mm, with ease, but the track that allows the mechanical lever to move is still rigid enough that the mechanical lever 102 will stay at the user-selected height. Once the mechanical lever 102 is set to the desired height of the consumable 126 in the container 120, the user activates the dispensing.

The microprocessor 108 receives the digital value of the displacement of the mechanical lever 102 and uses the generated digital three dimensional image of the container 120 to determine how much volume of the selected consumable 126 should be dispensed to achieve the user selection. Once the selected volume is calculated, the microprocessor 108 determines how much ingredients 116 are required for the amount of consumable 126 selected. In some embodiments, the microprocessor 108 communicates to the ingredient control device the amount to dispense and, if the consumable 126 requires it, the microprocessor 108 communicates to the water supply 112 and liquid heater 114 the required increments and heating time to achieve the user selected consumable 126 and amount. The microprocessor 108 also sends instructions to the mixing plates 110 if the selected consumable 126 requires additional mixing or altering before delivery to the container 120.

Expanding further upon the possible interactions between the microprocessor 108 and the plurality of ingredient reservoirs 116 in the dispensing process, the communication between the microprocessor 108 to the control device includes a plurality of individual commands of ingredient type and amount. For example, a communication between the microprocessor 108 and the control device for a hot chocolate consumable in two-thirds of the container 120 could include specific command values for the required ingredient types of milk, cocoa mix, water, marshmallows and water. The command could also include that the water supply 112 send the amount of water needed to the liquid heater 114 to be heated to a temperature, for example 100 degrees Fahrenheit, before being mixed with the other ingredients.

In some embodiments, the plurality of sensors 106 scan the container 120 after the mechanical lever 102 is set to the desired height level and the user has initiated the dispensing process. In other embodiments, the microprocessor 108 is in constant communication with the mechanical lever 102, such that, if the mechanical lever 102 is moved at any time after the dispensing process is initiated by the user, the microprocessor 108 recalculates the volume of consumable 126 required and communicates the new values to the ingredients 116 water supply 112 and liquid heater 114. For example, the mechanical lever 102 may be set at filing two-thirds of the container 120 at the moment when the user initiates the dispensing process, but the user may require the container 120 to be three-fourths full and move the mechanical lever 102 higher to that greater volumetric level. The microprocessor 108 would receive a change in value for the mechanical lever 102 height, calculate the additional ingredients 116 and ingredients needed and communicate the additional values to the system. Alternatively, if the user moves the lever 102 lower than the initially set height, the microprocessor 108 would receive a change in value for the mechanical lever 102 height, calculate the ingredients 116 no longer required and communicate the changed values to the system. In some arrangements, there may be a "stop dispensing" button that will cease the dispensing of the consumable when pushed.

In some embodiments, the microprocessor 108 is in constant communication with the plurality of sensors 106 in order to detect a change in the loading bay 118, specifically the removal or absence of a container 120 from the loading bay 118. For example, the mechanical lever 102 may be set at filing two-thirds of the container 120 at the moment when the user initiates the dispensing process, but the user may desire the container 120 to be only half-full and the user pulls the container 120 from the loading bay 118. The microprocessor 108 would detect the absence of the container 120 and stop all the ingredients from being dispensed to eliminate waste and spillage. Additionally, the user may initiate the dispensing the consumable 126 without placing the container 120 into the loading bay 118, which the microprocessor 108 would detect and would stop the dispensing process until a container 120 is provided and scanned. Alternatively, a presence detection sensor in combination with a "sleep mode" can allow for a power saving mode where the plurality of sensors 106 are not constantly on, but effectively available on demand.

In some embodiments, there are additional safety features implemented into the automatic consumable dispenser. The plurality of sensors 106 and microprocessor 108 that generate the three dimensional will also calculate and generate a wall thickness of the container 120. In some arrangements, the plurality of sensors 106 and microprocessor 108 may determine that the container 120 is a cup or bowl with a lip. The microprocessor 108 will account for such a design in the determination of the thickness of the container 120 as the plurality of scanners 106 can use the other container 120 scans to determine the usable container 120 space. The thickness of the container 120 will be a parameter into the consumable dispensing calculation and the microprocessor 108 will conduct a binary check into whether the selected consumable 126 has adequate wall thickness for the selected consumable 126 temperature. If the container 120 has walls that are too thin to safely store the selected hot consumable, for example soup is selected to be dispensed in a paper cup, the binary check would fail and the microprocessor 108 would not run the dispensing process. In some embodiments, the user would be prompted to make another consumable 126 selection or replace the container 120 with a vessel with adequate wall thickness. In other embodiments, the user would be prompted to provide confirmation that they are aware of the inadequate wall thickness for the selected hot consumable 126 and container 120 combination and want to proceed with the dispensing process. In some embodiments, the microprocessor 108 would be configured to adjust the heating temperature of the liquid in the liquid heater 114 so that the dispensed consumable 126 has a temperature that is safe given the calculated wall thickness of the container 120. This reconfiguration can be done automatically, or after confirmation from the user in response to a prompt on the machine interface to allow for a decrease in temperature of the dispensed consumable 126.

In some embodiments, there can be additional anti-spill and safety features implemented into the automatic consumable dispenser. One possible issue is a miscalculation of the container 120 volume such that the microprocessor 108 calculates to dispense too much consumable 126. This is especially troublesome if the selected consumable 126 is hot. A temperature sensor would be placed around the loading bay 118 and the sensor would be configured to send a shut off signal to the microprocessor 108 if the sensors detect a temperature above a safe degree. This would be helpful when a container 120 starts to over flow or is removed when a hot consumable 126 is being dispensed as the hot liquid would come into contact with the temperature sensor resulting in a shut off of the dispensing process by the microprocessor 108. In other embodiments, a moisture sensor is used in place of a temperature sensor to prevent spillage of cold, warm and hot beverage consumables. The moisture sensor would be placed around the loading bay 118 and the sensor would be configured to send a shut off signal to the microprocessor 108 if the sensors detect a moisture greater than the baseline moisture level. This would be helpful when a container 120 starts to over flow or is removed when a beverage consumable 126 is being dispensed as the liquid would come into contact with the moisture sensor resulting in a shut off of the dispensing process by the microprocessor 108. In some embodiments, a temperature sensor and a moisture sensor are used in tandem to provide the user with more safety and anti-spillage features.

Figure 4:
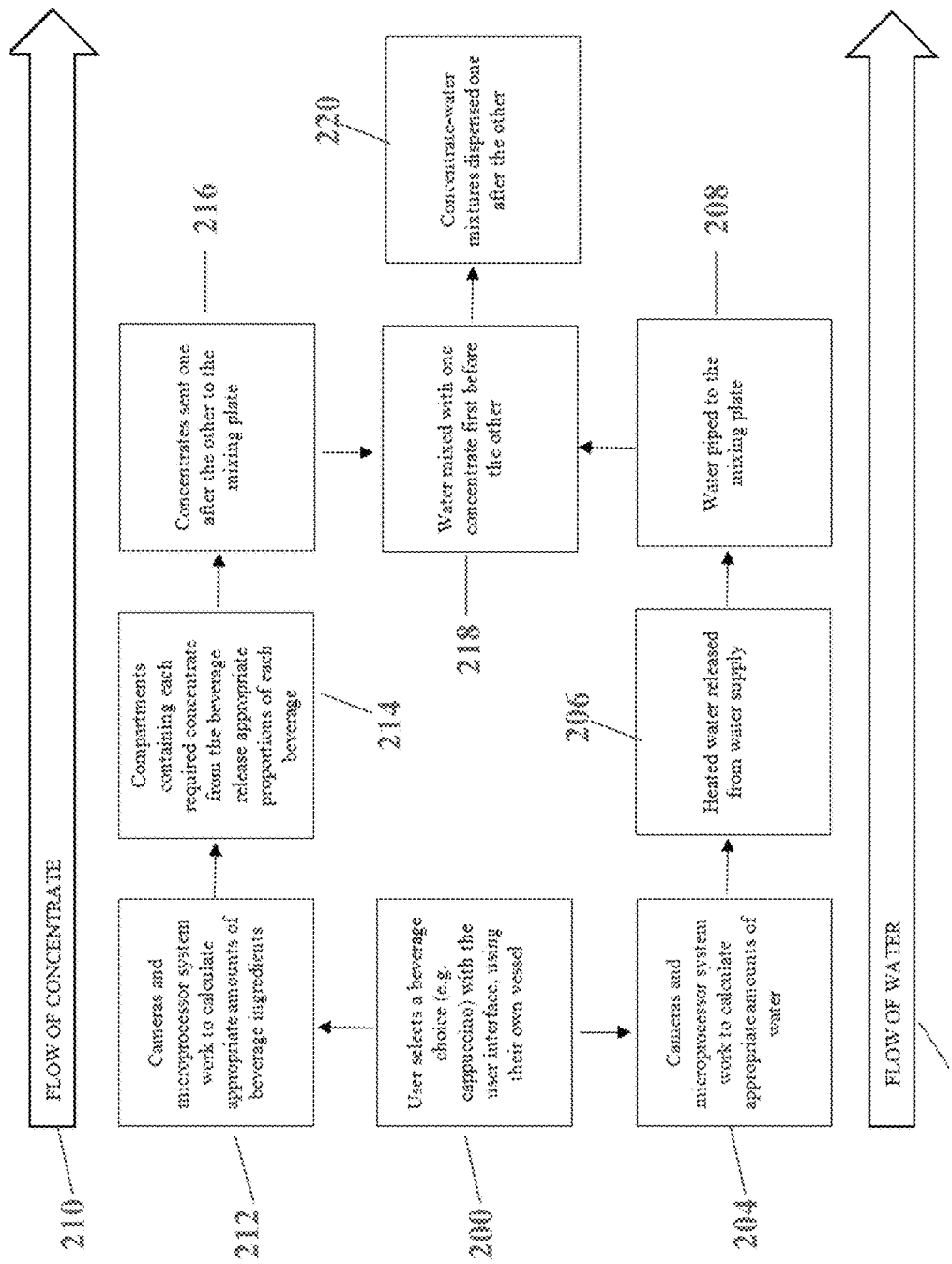
FIG. 4 illustrates a schematic flow diagram of a method for a user-controlled volume regulation mechanism on an automatic consumable dispenser.

FIG. 4 is a flow diagram that shows the parallel flows of the water and ingredient for a beverage consumable 126 selected by the user. The process begins when the user selects a liquid consumable 200, for example cappuccino, tea, coffee, etc. The user makes the consumable selection using some user interface and the user places their container into the automatic dispensing machine. Following the flow of the water 202 the plurality of sensors 106 and the microprocessor 108 work in tandem to generate a three dimensional rendering of the container 120 and in response to the user-controlled volume selection, the microprocessor 108 calculates the appropriate amount of water 204 to use in the dispensing processes. The amount of water could vary depending on the consumable 126 selected. In some embodiments, the consumable machine is able to dispense mixed alcoholic drinks, which would require two liquid inputs, the alcohol and the water for the soda, however there would still only be one calculation of water amount by the microprocessor 108. If the consumable selection requires water to be heated, the water will be heated in the liquid heater 114 and then the water supply will move to the mixing plate 206. Some consumable selections may require no water heating and therefore the liquid heater 114 will just act as a pass through for the water. The water is piped into the mixing plate 208 to be combined with the ingredient.

Working in parallel during this process is the flow of the ingredient 210. The plurality of sensors 106 and the microprocessor 108 work in tandem to generate a three dimensional rendering of the container 120 and in response to the user-controlled volume selection, the microprocessor 108 calculates the appropriate amount of ingredient 212 to use in the dispensing processes. The amount of ingredient could vary depending on the consumable 126 selected, in some embodiments, the consumable machine is able to dispense beverages that include mixed alcoholic drinks. In this embodiment, it would require two ingredient inputs, the alcohol and the sugar mix for the soda, therefore there would be two separate calculations for the amount of each ingredient by the microprocessor 108. Depending on the consumable selection, the compartments containing each required ingredient to generate the selected consumable 126 get released to the mixing plates 214. The ingredient is sent to the mixing plate to mix with the water 216. In other embodiments, a food consumable choice that requires more than one food item ingredient, or a food item ingredient(s) and beverage ingredient(s) can be distributed in a similar process.

In some embodiments, the water mixes with the ingredient 218 and if there are multiple ingredients 116 they are either mixed one after another or all at once. The mixing process and procedure depends on the consumable 126 selection and amount among other factors. Ultimately, the microprocessor 108 calculates the best mixing process to achieve the user desired result. The water and ingredient mix is then dispensed 220 to the user container 120 either one after another or all at once. The dispensing process and procedure depends on the consumable 126 selection, amount and mixing procedure among other factors. The microprocessor 108 calculates the best dispensing process to achieve the user desired result.

Figure 5:
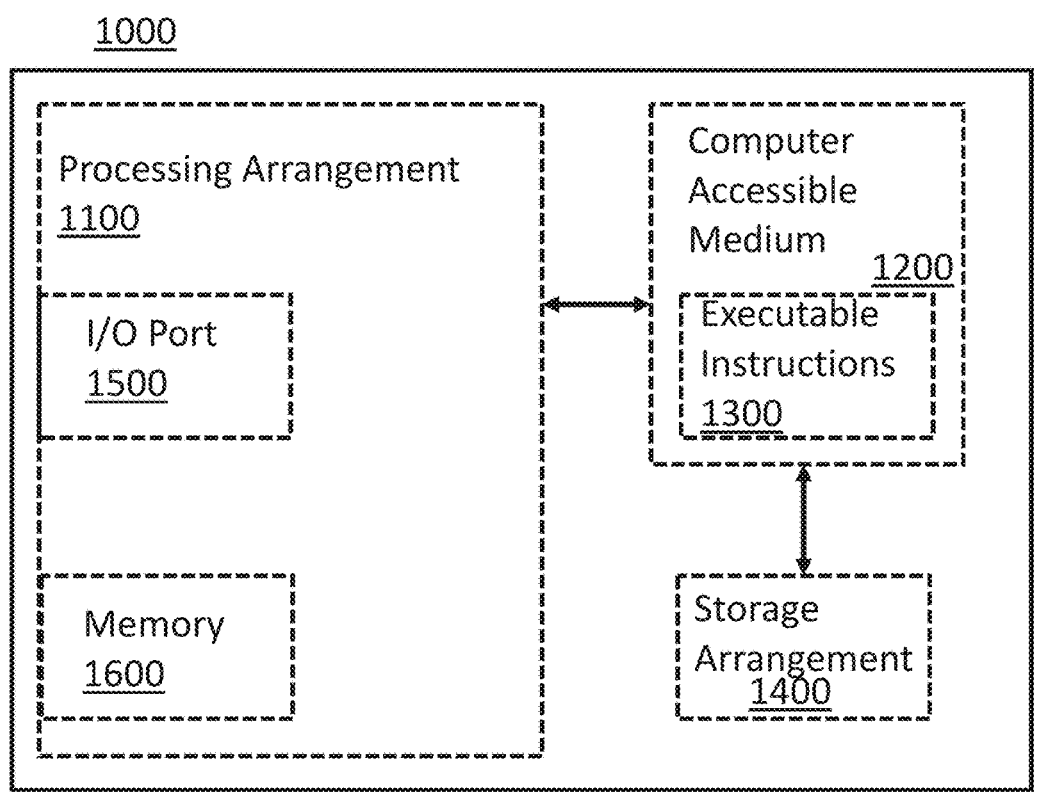
FIG. 5 illustrates a computer system for use with certain implementations.

As shown in FIG. 5, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 1100). The computer-accessible medium 1200 may be a non-transitory computer-accessible medium. The computer-accessible medium 1200 can contain executable instructions 1300 thereon. In addition or alternatively, a storage arrangement 1400 can be provided separately from the computer-accessible medium 1200, which can provide the instructions to the processing arrangement 1100 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment.

System 1000 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the disclosure have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. An automatic consumable dispenser comprising:
    a loading bay further comprising:
        a plurality of sensors positioned above a loading location for a container;
        an adjustable mechanical lever that moves vertically; and
        a visual aid attached to the adjustable mechanical lever;
    a plurality of ingredient reservoirs;
    at least one safety feature sensor, the safety feature sensor associated with the container and configured to transmit a shutdown command to a controller of the plurality of ingredient reservoirs if the least one safety feature sensor is triggered; and a microprocessor operably connected to the plurality of sensors and connected to the adjustable mechanical lever, wherein the microprocessor is configured to:
receive digital information from the plurality of sensors;
generate a three dimensional representation of the container;
receive a user consumable type;
receive a mechanical lever input;
calculate a container volume associated with the three dimensional representation of the container;
calculate a dispense consumable volume, wherein the dispense consumable volume is dependent on the mechanical lever input and the container volume;
calculate an ingredient output, wherein the ingredient output is dependent on the dispense consumable volume and the user consumable type, and
wherein the ingredient output comprises a plurality of commands for ingredient type and amount, comprising the type and amount of at least one of a solid ingredient and a liquid ingredient, required for the consumable type; and
transmit the ingredient output to a controller of the plurality of ingredient reservoirs.

2. The consumable dispenser in claim 1, wherein the at least one safety feature sensor is a temperature sensor at a base of the loading bay operably connected to the microprocessor, wherein the microprocessor is configured to:
transmit a shutdown command to a controller of the plurality of ingredient reservoirs if a safety threshold is met, wherein the safety threshold is responsive to a temperature reading by the temperature sensor at the base of the loading bay.

3. The consumable dispenser in claim 1, wherein the at least one safety feature sensor is a moisture sensor at a base of the loading bay operably connected to the microprocessor, wherein the microprocessor is configured to:
transmit a shutdown command to a controller of the plurality of ingredient reservoirs if a safety threshold is met, wherein the safety threshold is responsive to the moisture sensor detecting moisture from an ingredient in the plurality of ingredient reservoirs present at the base of the loading bay.

4. The consumable dispenser in claim 1, wherein the at least one safety feature sensor is a wall thickness sensor above the loading location for the container, the consumable dispenser configured to:
generate a container wall thickness value;
calculate a container wall temperature, the container wall temperature associated with the container wall thickness value and dispense temperature of the user consumable type;
conduct a binary check determining whether the container wall temperature is below a threshold wall temperature, the threshold wall temperature associated with user contact of the container wall; and
transmit a shutdown command to a controller of the plurality of ingredient reservoirs if the container wall temperature is above the threshold wall temperature.

5. The consumable dispenser in claim 1, wherein the at least one safety feature sensor is a detection sensor above the loading location for the container, the detection sensor configured to:
receive a binary value indicating container presence in the loading bay; and
transmit a shutdown command to a controller of the plurality of ingredient reservoirs if the binary value is negative.

6. The consumable dispenser in claim 1 wherein the reservoir of ingredients can be a liquid, solid or both.

7. The consumable dispenser in claim 1 wherein the visual aid attached to the adjustable mechanical lever is a laser.

8. The consumable dispenser in claim 1, wherein the plurality of sensors comprises a plurality of depth sensors, each depth sensor in the plurality of depth sensors having a sensor angle and a sensor location along the loading bay, wherein the plurality of depth sensors are configured to generate the three dimensional representation of the container by:
identifying a plurality of vertices of the container, wherein each vertex in the plurality of vertices is determined by a first depth sensor in the plurality of depth sensors capturing a plurality of forward projection data points and by a second depth sensor in the plurality of depth sensors capturing a plurality of back projection data points;
identifying a background, the background not associated with the container and outside of the a plurality of vertices of the container;
removing the background;
merging the plurality of forward projection data points and the plurality of back projection data points into a coordinate system to generate an accumulation matrix, the accumulation matrix identifying the plurality of vertices of the container; and
calculating a function of a sum of discrete element from the accumulation matrix to generate the three dimensional representation of the container.

* * * * *